United States Patent
Katori et al.

(10) Patent No.: US 9,703,361 B2
(45) Date of Patent: Jul. 11, 2017

(54) MEMORY CONTROL APPARATUS, MEMORY CONTROL METHOD, INFORMATION PROCESSING APPARATUS AND PROGRAM

(71) Applicant: Sony Corporation, Tokyo (JP)

(72) Inventors: Tomohiro Katori, Tokyo (JP); Katsuya Takahashi, Kanagawa (JP); Hiroki Nagahama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 666 days.

(21) Appl. No.: 13/792,896

(22) Filed: Mar. 11, 2013

(65) Prior Publication Data

US 2013/0275785 A1 Oct. 17, 2013

(30) Foreign Application Priority Data

Apr. 17, 2012 (JP) ................................. 2012-093711

(51) Int. Cl.
*G06F 1/32* (2006.01)

(52) U.S. Cl.
CPC .......... *G06F 1/3275* (2013.01); *G06F 1/3225* (2013.01); *G06F 1/3287* (2013.01); *G06F 1/3293* (2013.01); *Y02B 60/121* (2013.01); *Y02B 60/1228* (2013.01); *Y02B 60/1282* (2013.01)

(58) Field of Classification Search
CPC ..... G06F 1/00; G06F 1/04; G06F 1/12; G06F 1/26; G06F 1/32; G06F 11/30; G06F 15/16

See application file for complete search history.

(56) References Cited

U.S. PATENT DOCUMENTS

| | | | | |
|---|---|---|---|---|
| 6,894,691 | B2 * | 5/2005 | Juenger | G09G 5/39 326/30 |
| 8,296,773 | B2 * | 10/2012 | Bose | G06F 1/3203 713/300 |
| 2007/0083785 | A1 * | 4/2007 | Sutardja | G06F 1/3203 713/323 |

(Continued)

FOREIGN PATENT DOCUMENTS

JP 2011-70661 4/2011

OTHER PUBLICATIONS

"ARM: The Architecture for the Digital World", ARM Holdings, Inc., URL: <http://www.arm.com/ja/products/processors/technologies/bigLITTLEprocessing.php> (Search on Apr. 2, 2012), 2 pages.

*Primary Examiner* — Thomas Lee
*Assistant Examiner* — Mohammad A Rahman
(74) *Attorney, Agent, or Firm* — Chip Law Group

(57) ABSTRACT

There is provided a memory control apparatus including a deciding unit deciding, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended, and a power managing unit suppressing a power supplied to the second main storage apparatus and at least one of the multiple CPU cores in a case where the deciding unit decides that the second main storage apparatus is capable of being suspended.

4 Claims, 10 Drawing Sheets

(56) References Cited

U.S. PATENT DOCUMENTS

| | | | |
|---|---|---|---|
| 2009/0172283 A1* | 7/2009 | Khellah | G11C 5/14 711/118 |
| 2009/0328055 A1* | 12/2009 | Bose | G06F 1/3203 718/105 |
| 2010/0057983 A1* | 3/2010 | Borras | G06F 9/44573 711/105 |
| 2011/0239016 A1* | 9/2011 | Boyd | G06F 1/3203 713/320 |
| 2011/0252180 A1* | 10/2011 | Hendry | G06F 1/3203 711/3 |
| 2011/0283071 A1* | 11/2011 | Yokoya et al. | 711/162 |
| 2012/0072744 A1* | 3/2012 | Jain | G06F 1/3268 713/320 |
| 2013/0179710 A1* | 7/2013 | Chang | G06F 1/3215 713/322 |
| 2013/0246825 A1* | 9/2013 | Shannon | G06F 1/3275 713/324 |

\* cited by examiner

MEMORY CONTROL APPARATUS, MEMORY CONTROL METHOD, INFORMATION PROCESSING APPARATUS AND PROGRAM

BACKGROUND

The present disclosure relates to a memory control apparatus, memory control method, information processing apparatus and program. Especially, the present disclosure relates to a memory control apparatus, memory control method, information processing apparatus and program that can reduce the power consumption of a main storage apparatus.

There is suggested a technique of suppressing the power consumption of the whole system by an idle state such that a task is not assigned to a specific CPU core in a multi-core processor including a plurality of CPU cores (for example, see Japanese Patent Application Laid-Open No. 2011-70661).

Also, in a multi-core configuration system including a power-saving CPU core and a high-performance CPU core, there is an operation of switching between the power-saving CPU core and the high-performance CPU core according to the load condition of the system (for example, see ARM Holdings, Inc., homepage, [search on Apr. 2, 2012] Internet, <URL http://www.arm.com/ja/products/processors/technologies/bigLITTLEprocessing.php>).

SUMMARY

However, in the above related art, since the power of a main storage apparatus (i.e. main memory) is not considered, constant power is continuously supplied to the main storage apparatus regardless of the load condition. Therefore, there is a possibility that extra power is supplied to the main storage apparatus.

The present disclosure is made in view of the above conditions and can reduce the power consumption of a main storage apparatus.

According to a first embodiment of the present technology, there is provided a memory control apparatus including a deciding unit deciding, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended, and a power managing unit suppressing a power supplied to the second main storage apparatus and at least one of the multiple CPU cores in a case where the deciding unit decides that the second main storage apparatus is capable of being suspended.

According to the first embodiment of the present technology, there is provided a memory control method performed by a memory control apparatus controlling a first main storage apparatus that is a main storage apparatus with low power consumption and a second main storage apparatus with power consumption higher than the power consumption of the first main storage apparatus as memory devices of multiple CPU cores, the method including deciding whether the second main storage apparatus is capable of being suspended, and suppressing a power supplied to the second main storage apparatus and at least one of the multiple CPU cores in a case where it is decided that the second main storage apparatus is capable of being suspended.

According to the first embodiment of the present technology, there is provided a program that causes a computer to perform processing of deciding, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended, and suppressing a power supplied to the second main storage apparatus and at least one of the multiple CPU cores in a case where it is decided that the second main storage apparatus is capable of being suspended.

According to the first embodiment, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended is decided, and a power supplied to the second main storage apparatus and at least one of the multiple CPU cores is suppressed in a case where it is decided that the second main storage apparatus is capable of being suspended.

In addition, the program can be provided by being transmitted via transmission medium or by being recorded on recording medium.

According to a second embodiment of the present technology, there is provided an information processing apparatus including multiple CPU cores, a first main storage apparatus and a second main storage apparatus with power consumption higher than the power consumption of the first main storage apparatus, and a memory controlling unit controlling the first and second main storage apparatuses. The memory controlling unit includes a deciding unit deciding whether the second main storage apparatus is capable of being suspended, and a power managing unit suppressing a power supplied to the second main storage apparatus and at least one of the multiple CPU cores in a case where the deciding unit decides that the second main storage apparatus is capable of being suspended.

According to an embodiment of the present disclosure, it is decided in the memory controlling unit whether the second main storage apparatus is capable of being suspended, and, in a case where it is decided that the second main storage apparatus is capable of being suspended, the power supplied to the second main storage apparatus and at least one of the multiple CPU cores is suppressed.

The memory control apparatus and the information processing apparatus each may be independent apparatuses or may be internal blocks or modules forming one apparatus.

According to an embodiment of the present disclosure, it is possible to reduce the power consumption of a main storage apparatus.

DETAILED DESCRIPTION OF THE EMBODIMENT(S)

Figure 1:
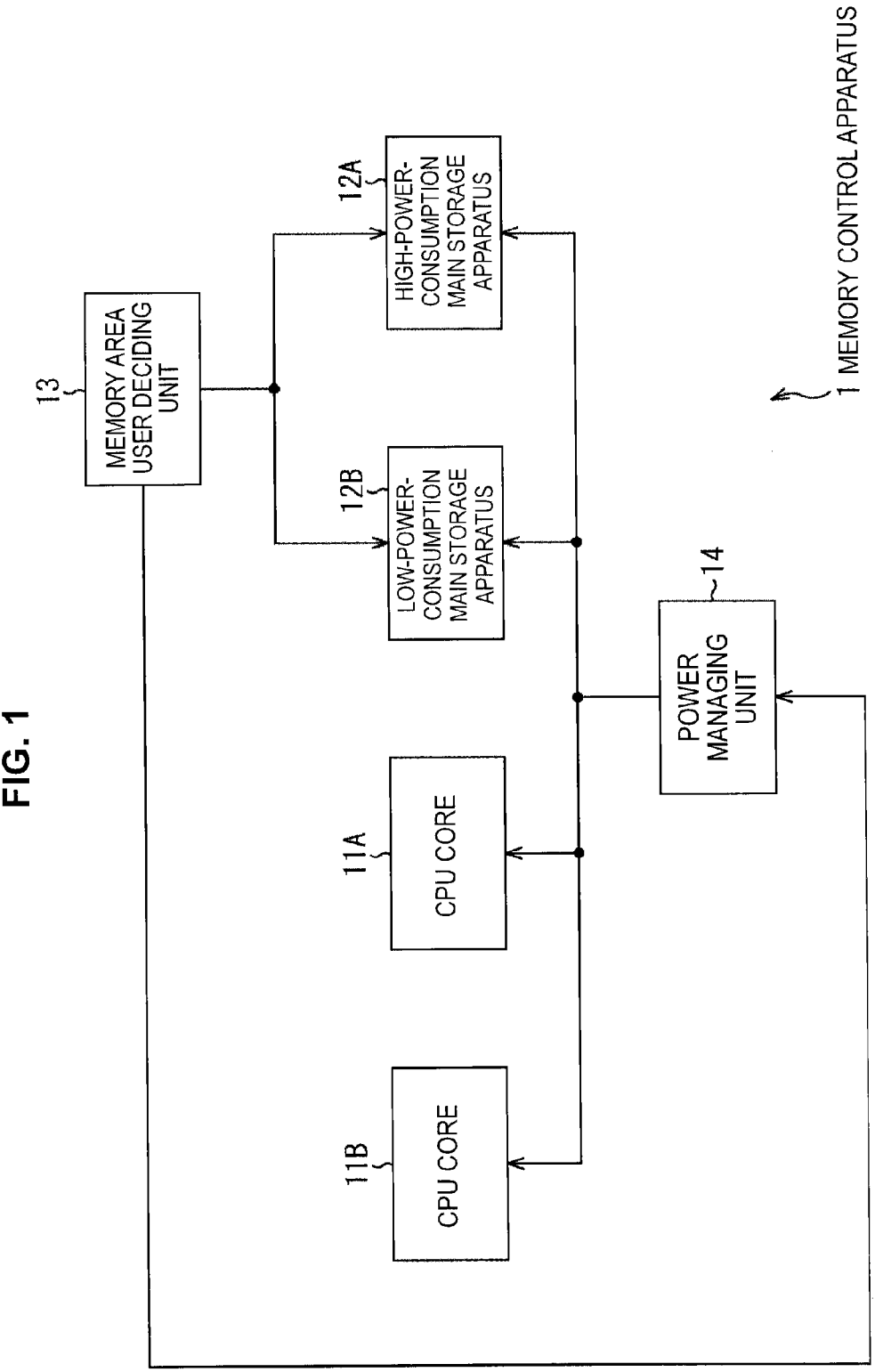
FIG. 1 is a block diagram illustrating a configuration of main units of a memory control apparatus to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In the following, configurations to implement the present disclosure (hereinafter referred to as "embodiments") are explained. Also, the explanation is given in the following order.

1. Outline of memory control apparatus to which the present disclosure is applied
2. First embodiment of memory control apparatus
3. Second embodiment of memory control apparatus
4. Variation example

1. Outline of Memory Control Apparatus

[Main Configuration Example of Memory Control Apparatus]

Figure 2:
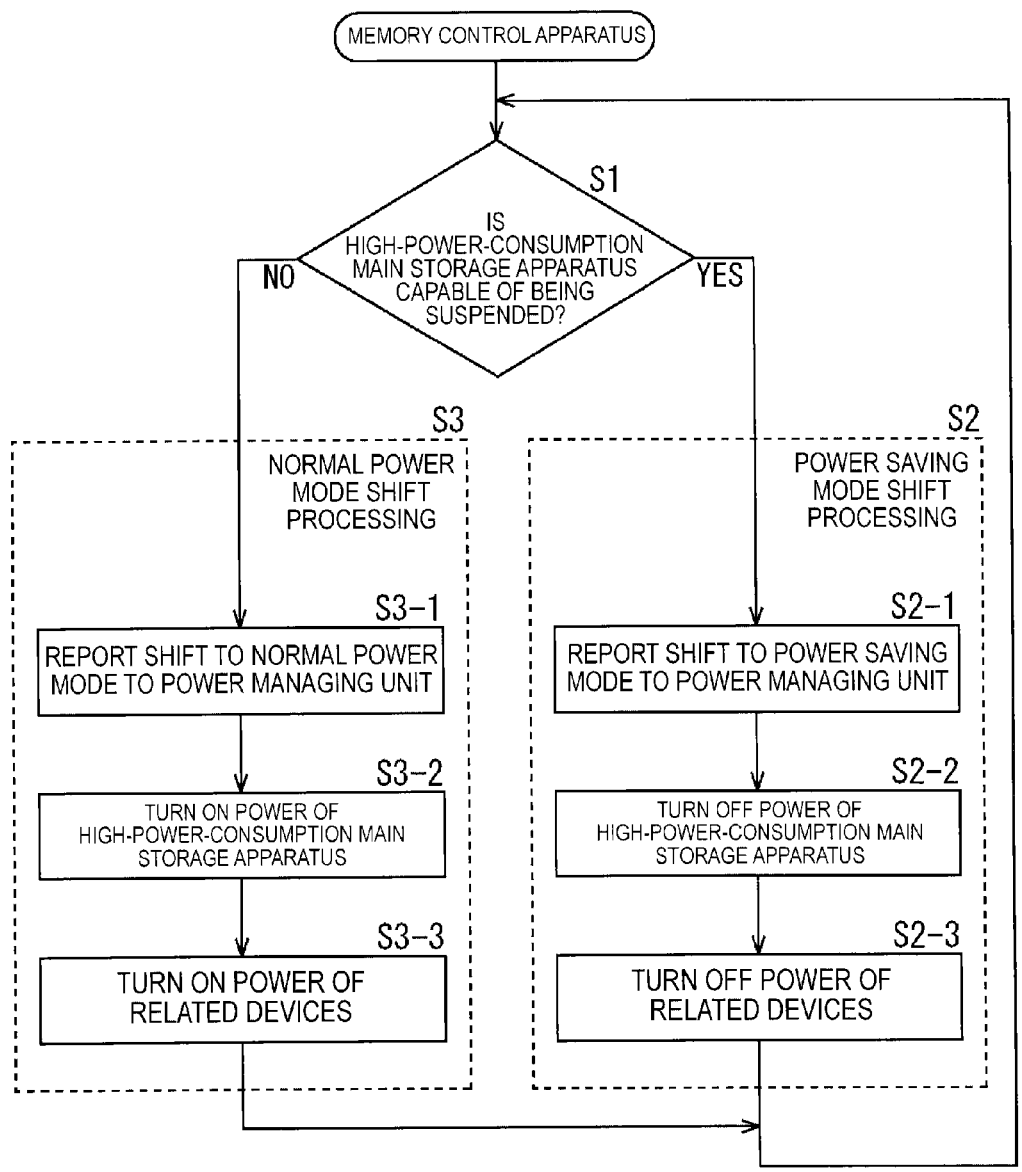
FIG. 2 is a flowchart for explaining memory control processing by a memory control apparatus.

First, with reference to FIGS. 1 and 2, an explanation is given to the outline of a memory control apparatus to which the present disclosure is applied.

FIG. 1 is a block diagram illustrating a configuration of main components of a memory control apparatus to which the present disclosure is applied.

A memory control apparatus 1 to which the present disclosure is applied controls a main storage apparatus 12 of an information processing apparatus including a plurality of CPU (Central Processing Unit) cores 11 and a plurality of main storage apparatuses 12. Here, the information processing apparatus denotes a mobile terminal such as a smartphone and tablet terminal, or an electronic device such as a personal computer, portable audio player, digital video camera and hard disk recorder.

As illustrated in FIG. 1, the memory control apparatus 1 includes at least a memory area user deciding unit 13 and a power managing unit 14. The numbers of CPU cores 11 and main storage apparatuses 12 held in the information processing apparatus are requested to be two or more, and are not specifically limited. In the present embodiment, as the simplest example, an example is explained where the memory control apparatus 1 controls two CPU cores 11A and 11B and two main storage apparatuses 12A and 12B.

The CPU cores 11A and 11B each are processing units to execute software (e.g. programs). As described below, the CPU cores 11A and 11B may be formed with the same CPU core or CPU cores of different types/features such as a high-performance and high-power-consumption CPU core and a low-power-consumption CPU core.

Meanwhile, the two main storage apparatuses 12 are formed with a high-power-consumption main storage apparatus 12A and a low-power-consumption main storage apparatus 12B. That is, the high-power-consumption main storage apparatus 12A is a byte-accessible and high-power-consumption memory device, and the low-power-consumption main storage apparatus 12B is a memory device of lower power consumption than the high-power-consumption main storage apparatus 12A. The high-power-consumption main storage apparatus 12A is formed with a nonvolatile memory such as a DRAM (Dynamic Random Access Memory), and the low-power-consumption main storage apparatus 12B is formed with a nonvolatile memory such as an MRAM (Magnetoresistive Random Access Memory).

The memory area user deciding unit 13 decides in which of the CPU cores 11 (i.e. the CPU core 11A and the CPU core 11B) the high-power-consumption main storage apparatus 12A and the low-power-consumption main storage apparatus 12B (or their memory areas) are used or are not used, and reports the decision result to the power managing unit 14. Also, the memory area user deciding unit 13 has, in advance, information about the CPU cores 11 such as the total number of CPU cores 11.

The power managing unit 14 controls power delivery such as power on or power off of the CPU cores 11A and 11B, the high-power-consumption main storage apparatus 12A and the low-power-consumption main storage apparatus 12B.

[Processing Flow of Memory Control Processing]

With reference to the flowchart in FIG. 2, memory control processing by the memory control apparatus 1 is explained.

First, in step S1, the memory area user deciding unit 13 decides whether the high-power-consumption main storage apparatus 12A is capable of being suspended. For example, in a case where all areas of the high-power-consumption main storage apparatus 12A are unused, the memory area user deciding unit 13 decides whether the high-power-consumption main storage apparatus 12A is capable of being suspended. Also, for example, although a task (process) executed by the CPU core 11 uses a partial area of the high-power-consumption main storage apparatus 12A, when the state of the task is in a sleep state in which the operation is not performed for a while, the memory area user deciding unit 13 decides that the high-power-consumption main storage apparatus 12A is capable of being suspended.

When it is decided in step S1 that the high-power-consumption main storage apparatus 12A is capable of being suspended, the processing proceeds to step S2 and the memory control apparatus 1 performs power saving mode shift processing of shifting an operation mode of the main storage apparatus 12 to a power saving mode.

The power saving mode shift processing in step S2 is formed with three steps of following steps S2-1 to S2-3.

In step S2-1, the memory area user deciding unit 13 reports a shift to the power consumption mode, to the power managing unit 14. The power managing unit 14 having received the report of the shift to the power saving mode turns off the power of the high-power-consumption main storage apparatus 12A in step S2-2. Further, the power managing unit 14 turns off the power of devices related to the high-power-consumption main storage apparatus 12A in step S2-3. Examples of the devices related to the high-power-consumption main storage apparatus 12A include the CPU core 11 that accesses only the high-power-consumption main storage apparatus 12A, a device defined to turn off its own power in association with the high-power-consumption main storage apparatus 12A, and so on.

When the steps S2-1 to S2-3 are finished, the processing returns to step S1.

Meanwhile, when it is decided in step S1 that the high-power-consumption main storage apparatus 12A is not capable of being suspended, the processing proceeds to step S3 and the memory control apparatus 1 performs normal power mode shift processing of shifting an operation mode of the main storage apparatus 12 to a normal power mode.

The normal power mode shift processing in step S3 is formed with three steps of following steps S3-1 to S3-3.

In step S3-1, the memory area user deciding unit 13 reports a shift to the normal power mode, to the power managing unit 14. The power managing unit 14 having received the report of the shift to the normal power mode turns on the power of the high-power-consumption main storage apparatus 12A in step S3-2. Further, the power managing unit 14 turns on the power of the devices related to the high-power-consumption main storage apparatus 12A in step S3-3. That is, the power managing unit 14 turns on the power of the devices whose power is turned off in above step S2-3.

When the steps S3-1 to S3-3 are finished, the processing returns to step S1.

Also, when the current operation mode of the main storage apparatus 12 is already an operation mode to be shifted, an execution of the shift processing is omitted.

As described above, according to the memory control processing in the memory control apparatus 1, it is decided whether the high-power-consumption main storage apparatus 12A is capable of being suspended, and, when it is decided that the high-power-consumption main storage apparatus 12A is capable of being suspended, the power of the high-power-consumption main storage apparatus 12A is turned off. By this means, it is possible to reduce the power consumption of the main storage apparatus 12 as a whole.

In the following, specific embodiments of the memory control apparatus 1 are explained.

2. First Embodiment of Memory Control Apparatus

Figure 3:
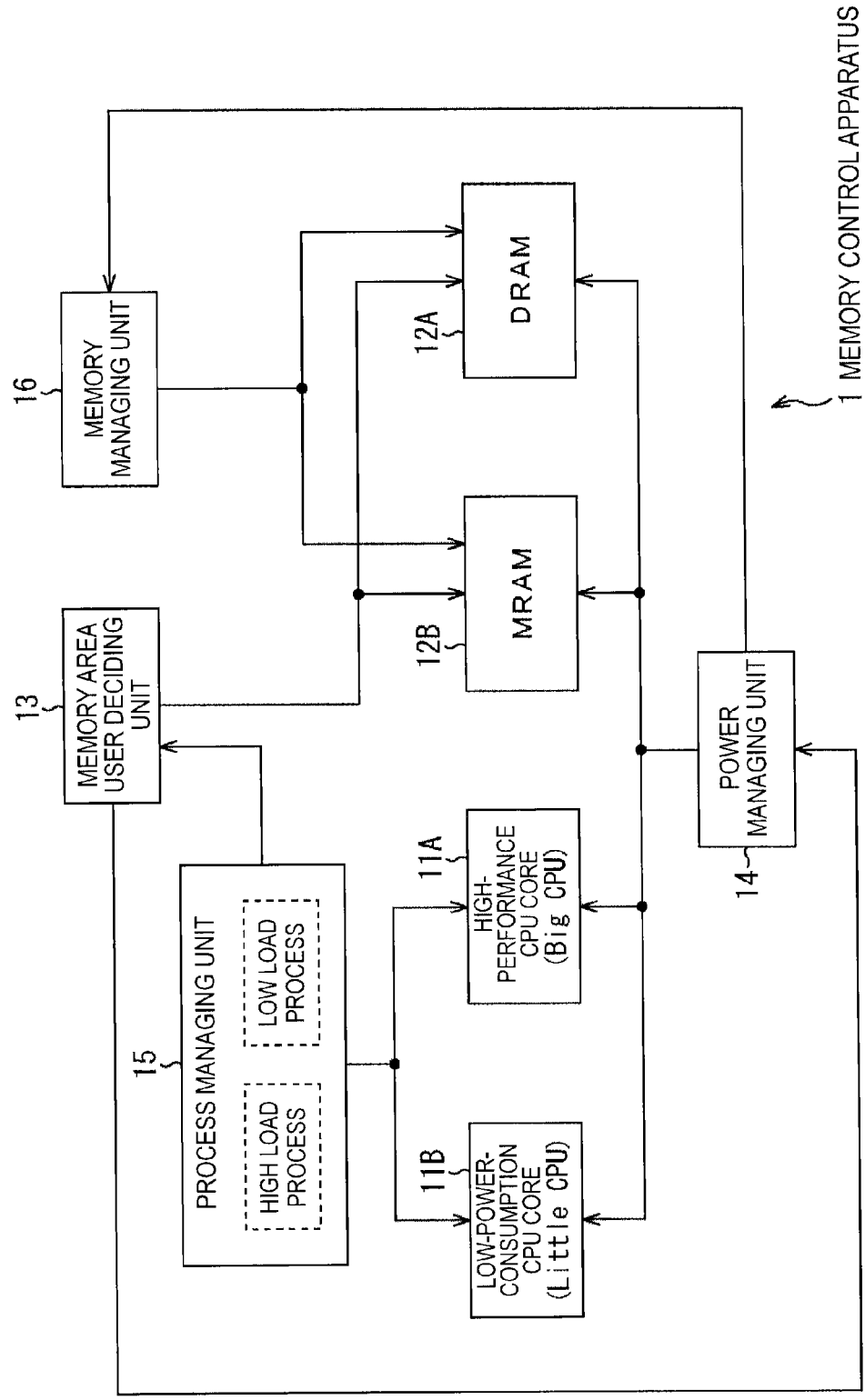
FIG. 3 is a block diagram illustrating a configuration example of a memory control apparatus according to the first embodiment.

FIG. 3 is a block diagram illustrating a configuration example of the memory control apparatus 1 according to the first embodiment.

In the first embodiment, the two CPU cores 11 are formed with a combination of the high-performance CPU core 11A and the low-power-consumption CPU core 11B. Also, the high-power-consumption main storage apparatus 12A is formed with as a DRAM and the low-power-consumption main storage apparatus 12B is formed with a DRAM. In the following, the high-power-consumption main storage apparatus 12A is referred to as "DRAM 12A" and the low-power-consumption main storage apparatus 12B is referred to as "MRAM 12B." Also, in FIG. 3, a process managing unit 15 and a memory managing unit 16 are newly added.

The high-performance CPU core 11A is a CPU core which has high processing capability and high performance and whose power consumption is relatively large. The low-performance CPU core 11B is a CPU core which has lower processing capability than the high-performance CPU core 11A and whose power consumption is smaller than the high-performance CPU core 11A.

The DRAM 12A is a kind of a volatile memory, requests power to hold memory and therefore is a main storage apparatus with relatively high power consumption. Meanwhile, the MRAM 12B is a kind of a nonvolatile memory, requests no power to hold memory and therefore has a feature of lower power consumption than the volatile memory.

The process managing unit 15 controls (or manages) an assignment of process to the CPU core 11. That is, the process managing unit 15 controls whether a process to be executed is executed in the high-performance CPU core 11A or it is executed in the low-power-consumption CPU core 11B. The process is classified into a high load process or a low load process according to the processing load, where the high load process can be executed only in the high-performance CPU core 11A and the low load process can be executed in both of the high-performance CPU core 11A and the low-power-consumption CPU core 11B.

For example, an attribute indicating whether the process is a high load process or it is a low load process is determined in advance with respect to the process at the time of creation, each process is activated while clarifying its own attribute at the time of activation, and the process managing unit 15 can recognize it based on the attribute clarified at the time of activation. For example, at the time of application creation, it is possible to determine an attribute indicating that an application having a GUI (Graphical User Interface) is a high load process and an application without the GUI is a low load process, and it can be clarified and activated.

Also, in a case where the attribute is not clarified at the time of activation, the process managing unit 15 can decide whether it is a high load process or it is a low load process, in the following way. For example, at the time immediately after activation of OS (Operating System) which is basic software to execute a process, there are many cases where a resident application in a service-type low-load state is activated. Therefore, an application activated within a certain period of time from the activation of OS can be recognized as a low load process, and an application activated after the time period can be recognized as a high load process.

Alternatively, each process may be recognized as a low load process for defined times after the first activation, a relationship with the load of the whole system at the time of activation of the process may be learned, the attribute of the process may be assigned and recognition may be performed using the assigned attribute.

The process managing unit 15 supplies process operation information indicating a currently executed process to the memory area user deciding unit 13. Here, the process managing unit 15 is in charge of a function executed by an OS kernel and the process operation information is written in the MRAM 12B as OS management information by the OS kernel. The memory area user deciding unit 13 checks the process operation information written in the MRAM 12B by the process managing unit 15, thereby supplying the process operation information from the process managing unit 15 to the memory area user deciding unit 13. The process operation information supplied to the memory area user deciding unit 13 includes the attribute of the process.

The memory managing unit 16 manages the memory area assigned to each process. To be more specific, the memory managing unit 16 performs control such that a memory area for a low load process is assigned to the MRAM 12B and a memory area for a high load process is assigned to the DRAM 12A.

Figure 4:
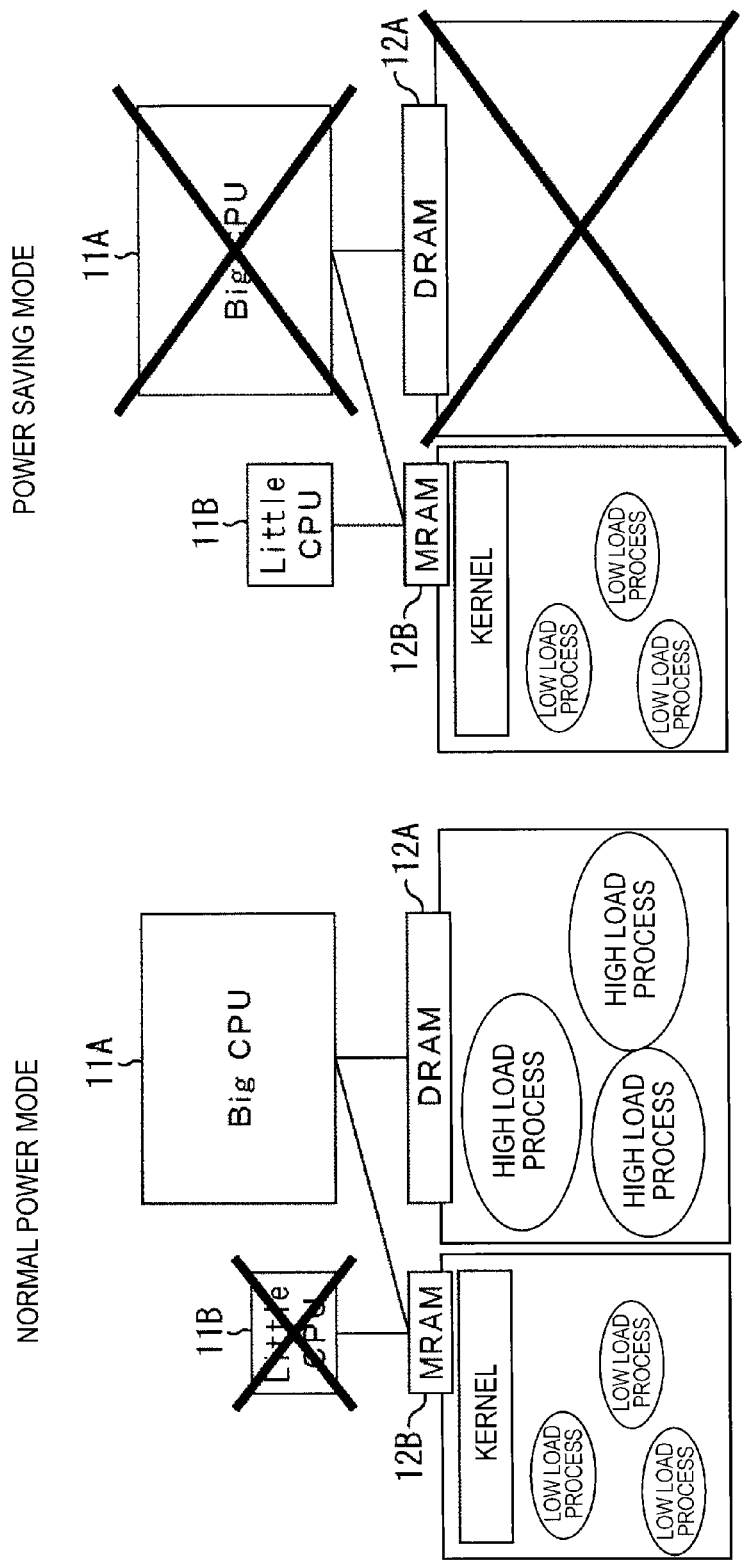
FIG. 4 is a view illustrating a difference between a power saving mode and a normal power mode according to the first embodiment.

FIG. 4 is a view illustrating a difference between a power saving mode and a normal power mode according to the first embodiment.

In the normal power mode, the high-performance CPU core 11A operates and the low-power-consumption CPU core 11B does not operate. Also, regarding memory devices, in the normal power mode, both the MRAM 12B of low power consumption and the DRAM 12A of high power consumption operate. In the DRAM 12A, data used by the high load process is stored.

Meanwhile, in the power saving mode, the low-power-consumption CPU core 11B operates and the high-performance CPU core 11A does not operate. Also, regarding memory devices, the MRAM 12B of low power consumption operates but the DRAM 12A of high power consumption does not operate. It is assumed that the power saving mode operates immediately after an activation of OS, the kernel or the low load process (i.e. application program) executed within a certain period of time from the activation is stored in the MRAM 12B.

As described above, operations of the high-performance CPU core 11A and the low-power-consumption CPU core 11B are switched between the power saving mode and the normal power mode. Also, whether to use the DRAM 12A of high power consumption varies between the power saving mode and the normal power mode.

[Processing Flow of Memory Control Processing According to the First Embodiment]

Figure 5:
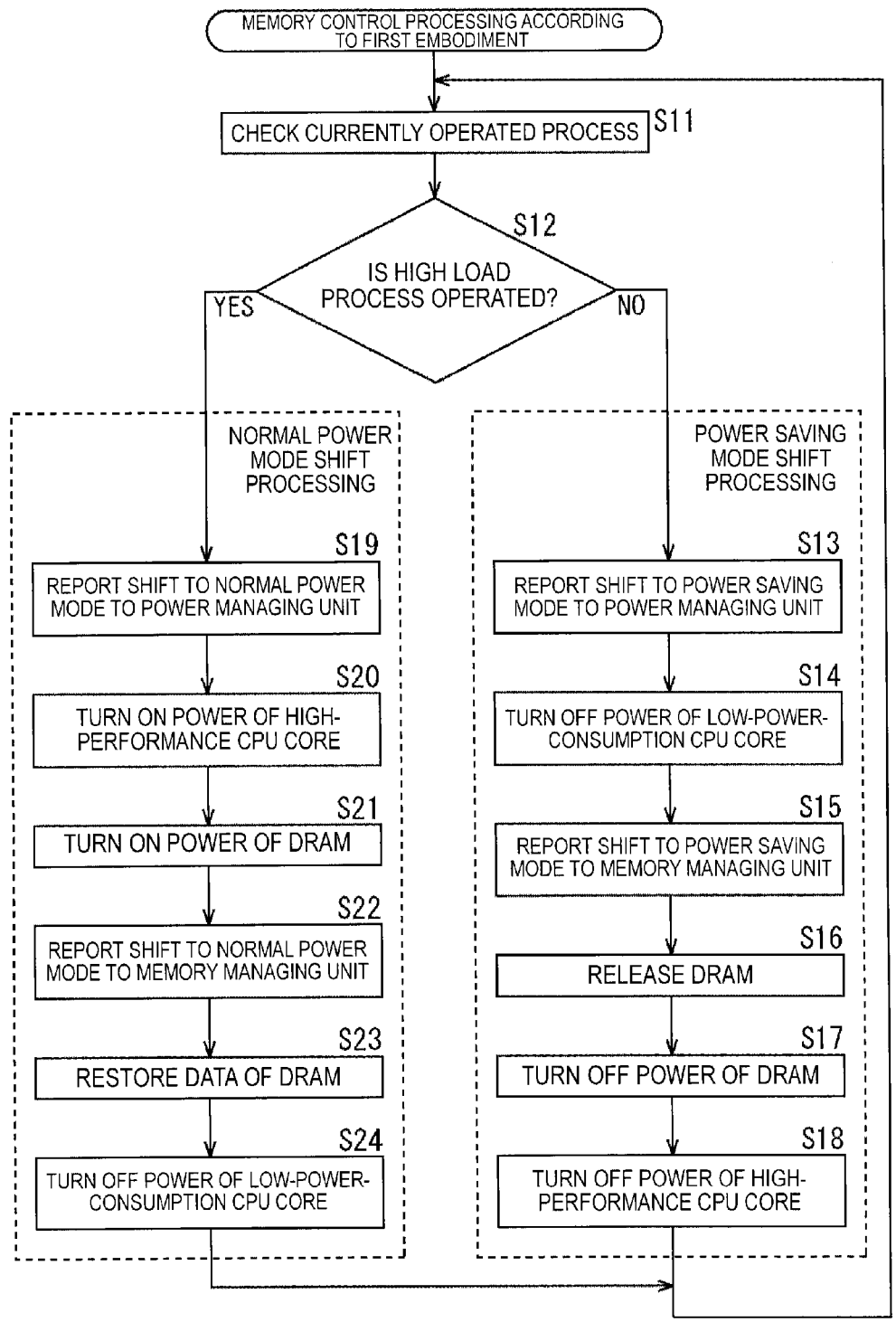
FIG. 5 is a flowchart for explaining memory control processing according to the first embodiment.

With reference to the flowchart in FIG. 5, memory control processing according to the first embodiment is explained.

In step S11, the process managing unit 15 supplies process operation information indicating a currently executed process to the memory area user deciding unit 13 and the memory area user deciding unit 13 checks an operated process based on the supplied process operation information.

In step S12, the memory area user deciding unit 13 decides whether a high load process operates. The process (or task) states include "during processing" showing that a predetermined operation is currently executed, "during end processing" showing the midstream of processing for termination and "sleep" showing a sleep state. If there is no high load process in the state of "during processing," the memory area user deciding unit 13 decides that the high load process does not operate.

When it is decided in step S12 that the high load process does not operate, the processing proceeds to step S13 and the power saving mode shift processing in steps S13 to S18 is performed.

That is, in step S13, the memory area user deciding unit 13 reports the shift to the power saving mode, to the power managing unit 14.

In step S14, the power managing unit 14 having received the report of the shift to the power saving mode turns on the power of the lower-power-consumption CPU core 11B for initialization, and, in step S15, reports the shift to the power saving mode to the memory managing unit 16.

In step S16, the memory managing unit 16 releases the DRAM 12A. To be more specific, the memory managing unit 16 excludes the DRAM 12A from a memory area used in response to a new assignment request. Also, in a case where data to be used by a high load process in the sleep state remains in the DRAM 12A, the memory managing unit 16 performs processing of moving the data to an external storage apparatus such as a HDD.

In step S17, the power managing unit 14 turns off the power of the DRAM 12A for which release processing is finished, and, in step S18, turns off the power of the high-performance CPU core 11A.

When the processing in step S18 is finished, the processing returns to step S11.

Meanwhile, when it is decided in step S12 that the high load process operates, the processing proceeds to step S19 and the normal power mode shift processing in steps S19 to S24 is performed.

That is, in step S19, the memory area user deciding unit 13 reports the shift to the normal power mode, to the power managing unit 14.

In step S20, the power managing unit 14 having received the report of the shift to the normal power mode turns on the power of the high-performance CPU core 11A and initializes the high-performance CPU core 11A.

Subsequently, in step S21, the power managing unit 14 turns on the power of the DRAM 12A and initializes the DRAM 12A, and, in step S22, reports the shift to the normal power mode to the memory managing unit 16.

The memory managing unit 16 having received the report of the shift to the normal power mode restores data of the DRAM 12A in step S23. To be more specific, the memory managing unit 16 adds the DRAM 12A to the memory used in response to the new assignment request and, if there is the data moved to the external storage apparatus in above step S16, performs processing of writing the moved data in the original area. Here, the timing of restoring the moved data may be the time the data is requested.

In step S24, the power managing unit 14 turns off the power of the low-power-consumption CPU core 11B.

When the processing in step S24 is finished, the processing returns to step S11.

By performing above memory control processing, as explained with reference to FIG. 4, it is possible to perform operations while switching between the normal power mode and the power saving mode, where the normal power mode allows the high-performance CPU core 11A, the DRAM 12A and the MRAM 12B to be operated and the power saving mode allows only the low-power-consumption CPU core 11B and the MRAM 12B to be operated. In the power saving mode, not only the CPU core 11 but also the DRAM 12A are stopped to perform control such that only the MRAM 12B of low power consumption is used, and therefore it is possible to reduce the power consumption.

3. Second Embodiment of Memory Control Apparatus

Figure 6:
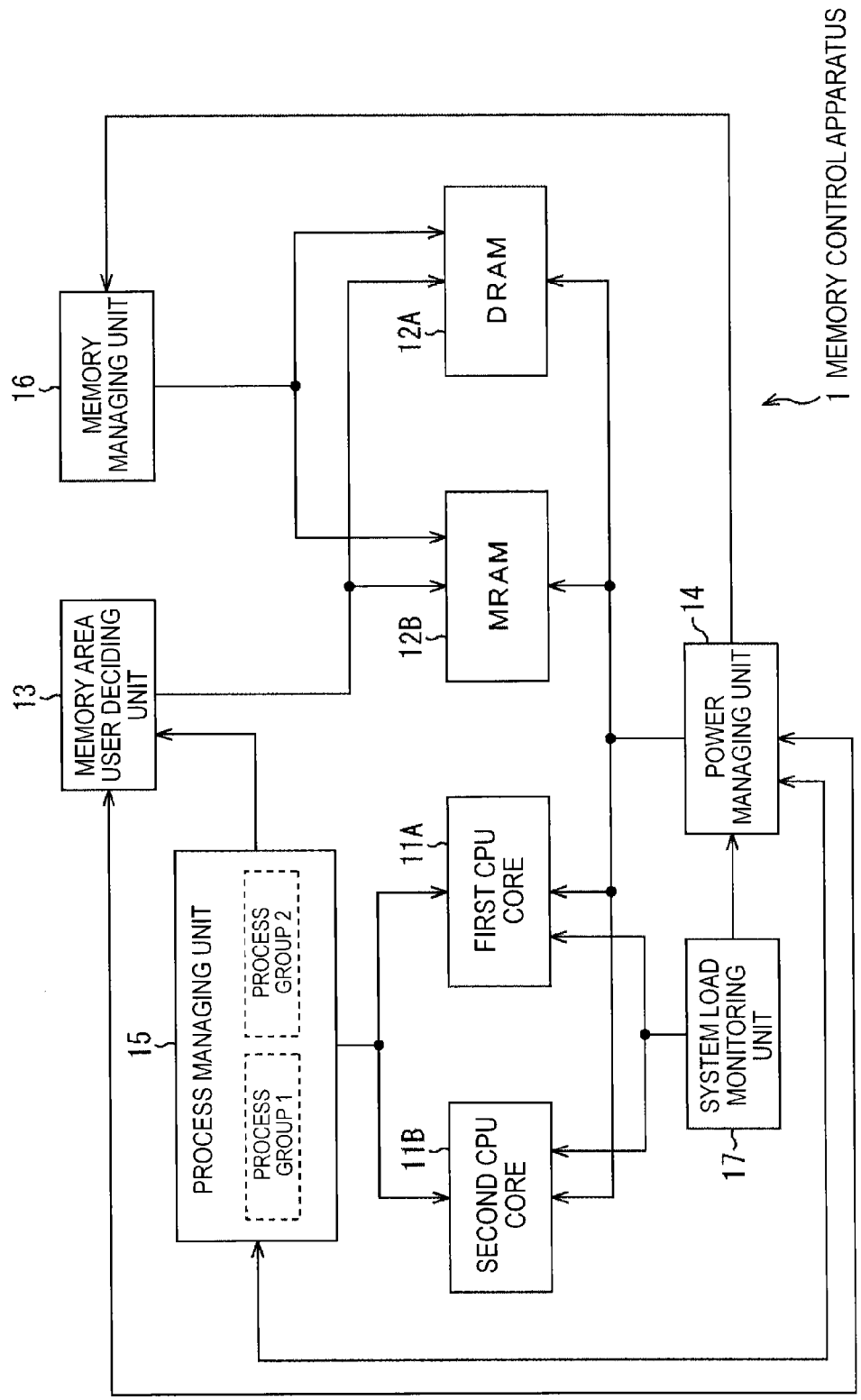
FIG. 6 is a block diagram illustrating a configuration example of a memory control apparatus according to the second embodiment.

FIG. 6 is a block diagram illustrating a configuration example of the memory control apparatus 1 according to the second embodiment.

In the second embodiment, the same reference numerals are assigned to the same components as in the above first embodiment and an explanation of overlapping parts is adequately omitted.

When the second embodiment is compared to the above first embodiment, they are difference in that two CPU cores 11 have the same performance. In the second embodiment, as illustrated in FIG. 6, the two CPU cores 11 of the same performance are referred to as "first CPU core 11A" and "second CPU core 11B."

The process managing unit 15 controls (or manages) whether an executed process is performed in the first CPU core 11A or it is performed in the second CPU core 11B. In the second embodiment, unlike the first embodiment, there is no assignment rule by conditions such as a processing load. In the following, collection of processes assigned to the first CPU core 11A is referred to as "process group 1" and collection of processes assigned to the second CPU core 11B is referred to as "process group 2." The process managing unit 15 supplies process operation information indicating a currently executed process to the memory area user deciding unit 13.

Also, in the second embodiment, there is newly added a system load monitoring unit 17 that monitors and reports the load states of the two CPU cores 11 to the power managing unit 14. The system load monitoring unit 17 monitors the usage rate of each CPU core 11 as the load state of each CPU core 11, and, in a case where the total usage rate of the two CPU cores 11 is less than a predetermined value defined in advance, reports a shift to the power saving mode to the power managing unit 14. Meanwhile, in a case where the total usage rate of the CPU cores 11 is less than the predetermined value, the system load monitoring unit 17 reports a shift to the normal power mode to the power managing unit 14.

The power managing unit 14 switches between the power saving mode and the normal power mode, based on the report from the system load monitoring unit 17. In a case where the power saving mode and the normal power mode are switched, the power managing unit 14 reports a shift to the operation mode to the area user deciding unit 13, the process managing unit 15 and the memory managing unit 16. Also, in the case of a shift to the power saving mode, the power managing unit 14 determines the CPU core 11 whose power is turned off, based on a CPU off report supplied from the memory area user deciding unit 13, and turns off the power of the determined CPU core 11.

Based on the process operation information from the process managing unit 15, the memory area user deciding unit 13 decides processes using the areas of the DRAM 12A and the MRAM 12B. Subsequently, in a case where the report to the shift to the power saving mode is supplied from the power managing unit 14, the memory area user deciding unit 13 specifies the CPU core 11 in which the usage amount of the MRAM 12B is smaller, and supplies the result to the power managing unit 14 as a CPU off report. Based on the CPU off report, the power managing unit 14 determines the CPU core 11 in which the usage amount of the MRAM 12B is smaller, as the CPU 11 whose power is turned off, and turns off the power.

Figure 7:
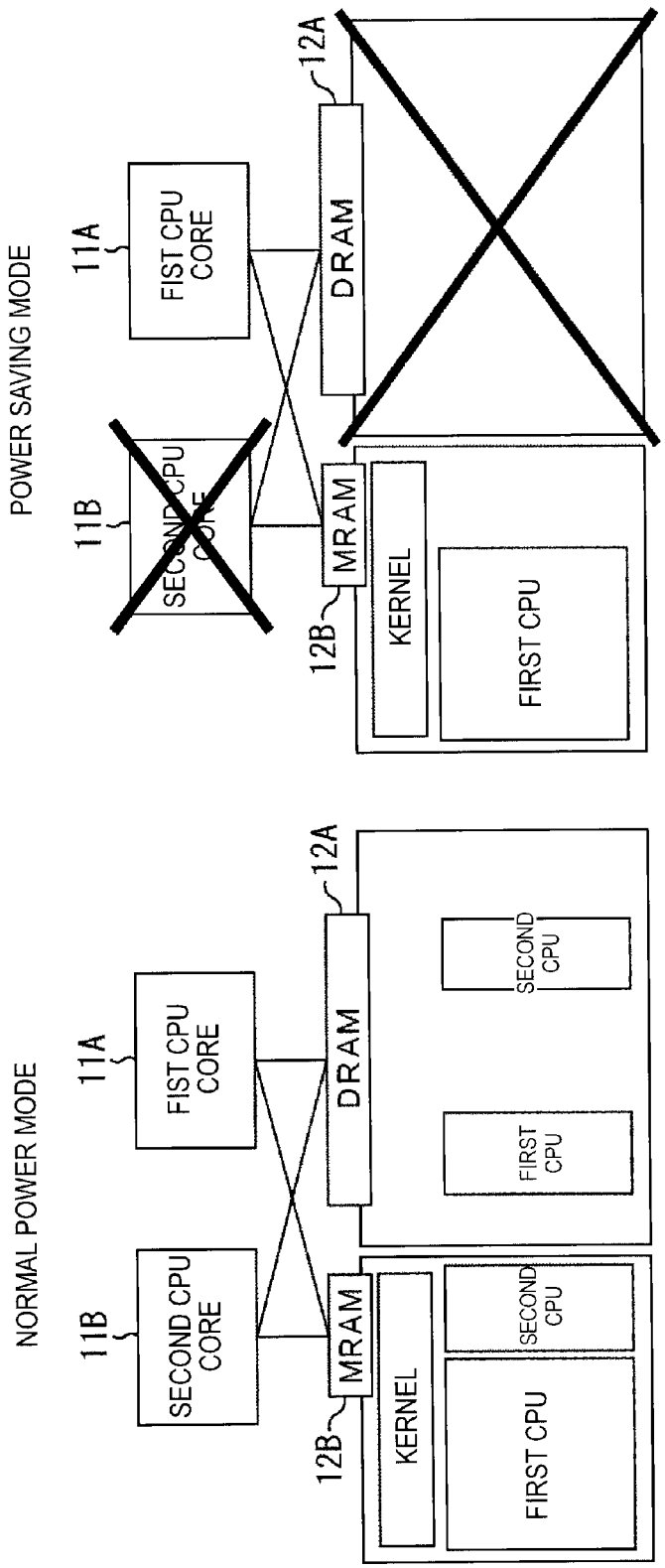
FIG. 7 is a view illustrating a difference between a power saving mode and a normal power mode according to the second embodiment.

FIG. 7 is a view illustrating a difference between the power saving mode and the normal power mode according to the second embodiment.

In the normal power mode, all CPU cores 11 and main storage apparatuses 12 operate. That is, the first CPU core 11A, the second CPU core 11B, the DRAM 12A and the MRAM 12B operate.

By contrast with this, in the power saving mode, only the MRAM 12B and one of the first CPU core 11A and the second CPU core 11B operate. Here, in the case of the shift to the power saving mode, as described above, whether power of the first CPU core 11A is turned off or power of the second CPU core 11B is turned off is determined based on the usage amount of the MRAM 12B. For example, in a case where the usage states of the DRAM 12A and the MRAM 12B are the states as shown in the normal power mode in FIG. 7, since the usage amount of the second CPU core 11B is smaller in the memory area of the MRAM 12B whose operation continues, the power of the second CPU core 11B is turned off. The state of the power saving mode in FIG. 7 shows a state where the normal power mode in FIG. 7 is shifted to the power saving mode.

As described above, in the second embodiment, the number of operated CPU cores 11 and whether to use the DRAM 12A of high power consumption vary between the power saving mode and the normal power mode.

[Processing Flow of Memory Control Processing According to the Second Embodiment]

Figure 8:
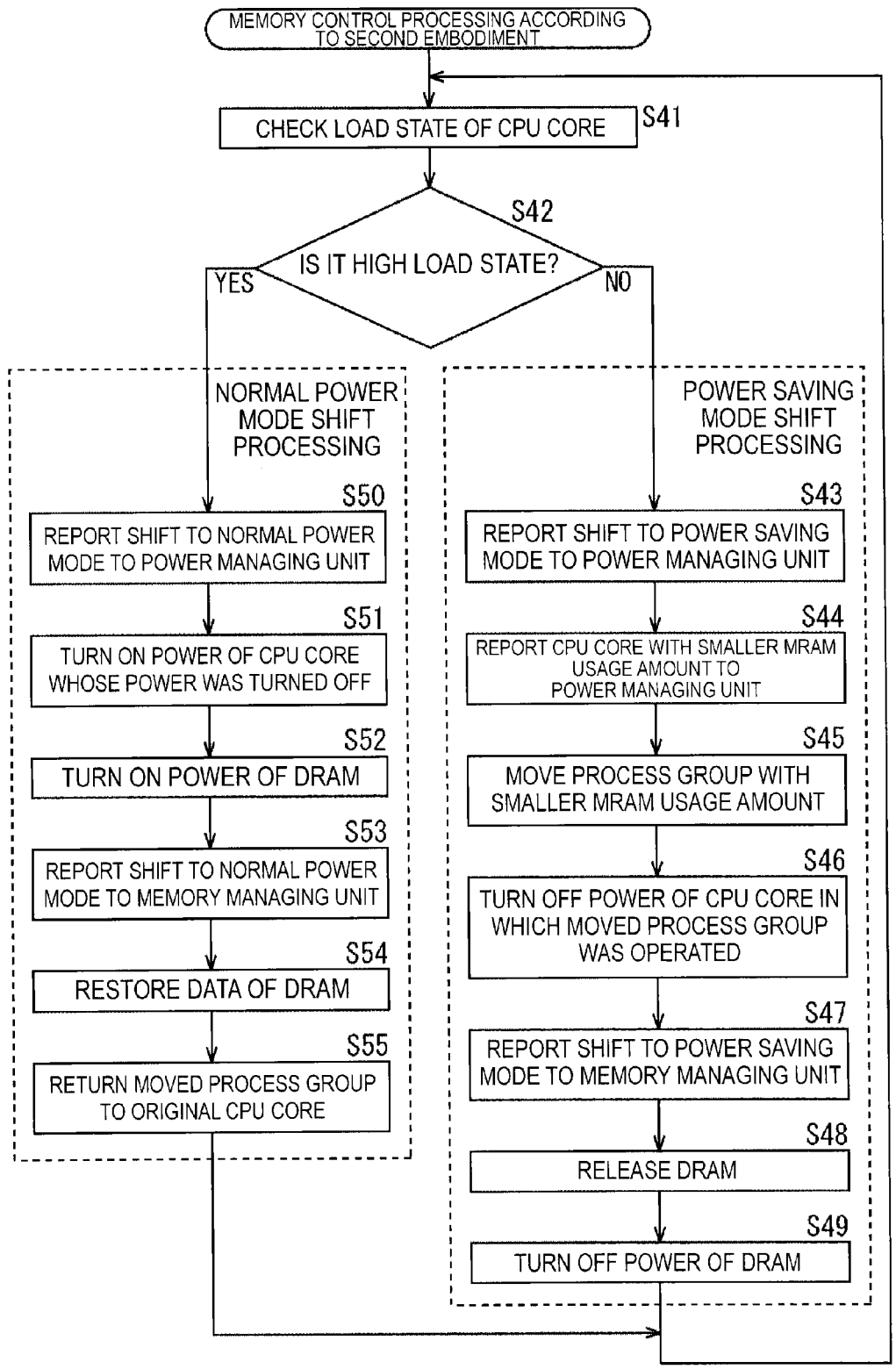
FIG. 8 is a flowchart for explaining memory control processing according to the second embodiment.

With reference to FIG. 8, memory control processing according to the second embodiment is explained.

In step S41, the system load monitoring unit 17 checks the load state of the CPU core 11, and, more specifically, checks the total usage rate of the CPU core 11. Subsequently, in step S42, the system load monitoring unit 17 decides whether the load state of the CPU core 11 is a high load state.

When it is decided in step S42 that the load state of the CPU core 11 is not the high load state, the processing proceeds to step S43 and power saving mode shift processing in steps S43 to S48 is performed.

That is, in step S43, the system load monitoring unit 17 reports the shift to the power saving mode to the power managing unit 14 and the power managing unit 14 reports the shift to the power saving mode to the memory area user deciding unit 13.

In step S44, the memory area user deciding unit 13 having received the report of the shift to the power saving mode specifies the CPU core 11 in which the usage amount of the MRAM 12B is smaller, from the two CPU cores 11, and supplies the result to the power managing unit 14 as a CPU off report.

In step S45, the power managing unit 14 reports the shift to the power saving mode to the process managing unit 15 and moves processes (i.e. group) operated in the CPU core 11 in which the usage amount of the MRAM 12B is smaller. The process managing unit 15 moves the processes (i.e. group) operated in the CPU core 11 in which the usage amount of the MRAM 12B is smaller, to the other CPU core 11. To be more specific, when stopping the moved processes and executing these next time, the process managing unit 15 performs control such that the processes are assigned to the other CPU core 11.

In step S46, the power managing unit 14 turns off the power of the CPU core 11 in which the moved processes were operated (which is adequately referred to as "source CPU core 11" below). In the example shown in FIG. 7, the power managing unit 14 turns off the power of the second CPU core 11B as the source CPU core 11.

In step S47, the power managing unit 14 reports the shift to the power saving mode to the memory managing unit 16.

In step S48, the memory managing unit 16 releases the DRAM 12A. To be more specific, the memory managing unit 16 excludes the DRAM 12A from a memory area used in response to a new assignment request, and, in a case where data to be used remains in the DRAM 12A, performs processing of moving the data to an external storage apparatus such as a HDD.

In step S49, the power managing unit 14 turns off the power of the DRAM 12A for which release processing is finished.

When the processing in step S49 is finished, the processing returns to step S41.

Meanwhile, when it is decided in step S42 that the load state of the CPU core 11 is the high load state, the processing proceeds to step S50 and normal power mode shift processing in steps S50 to S55 is performed.

That is, in step S50, the system load monitoring unit 17 reports the shift to the normal power mode to the power managing unit 14.

In step S51, the power managing unit 14 having received the report of the shift to the normal power mode turns on the power of the CPU core 11 whose power is turned off, for initialization.

Subsequently, in step S52, the power managing unit 14 turns on the power of the DRAM 12A and initializes the DRAM 12A, and, in step S53, reports the shift to the normal power mode to the process managing unit 15 and the memory managing unit 16.

In step S54, the memory managing unit 16 having received the report of the shift to the normal power mode restores data of the DRAM 12A. To be more specific, the memory managing unit 16 adds the DRAM 12A to an area used in response to a new assignment request, and, if there is the data moved to the external storage apparatus in above step S48, performs processing of writing the moved data in the original area.

In step S55, the process managing unit 15 having received the report of the shift to the normal power mode returns the process group moved in above step S45 to the source CPU core 11.

When the processing in step S55 is finished, the processing returns to step S41.

By performing the above memory control processing, as explained with reference to FIG. 7, it is possible to perform operations while switching between the normal power mode and the power saving mode, where the normal power mode allows all CPU cores 11 and main storage apparatuses 12 to be operated and the power saving mode allows only one CPU core 11 and the MRAM 12B to be operated. In the power saving mode, not only the CPU core 11 but also the DRAM 12A are stopped to perform control such that only the MRAM 12B of low power consumption is used, and therefore it is possible to reduce the power consumption.

4. Variation Example

Figure 9:
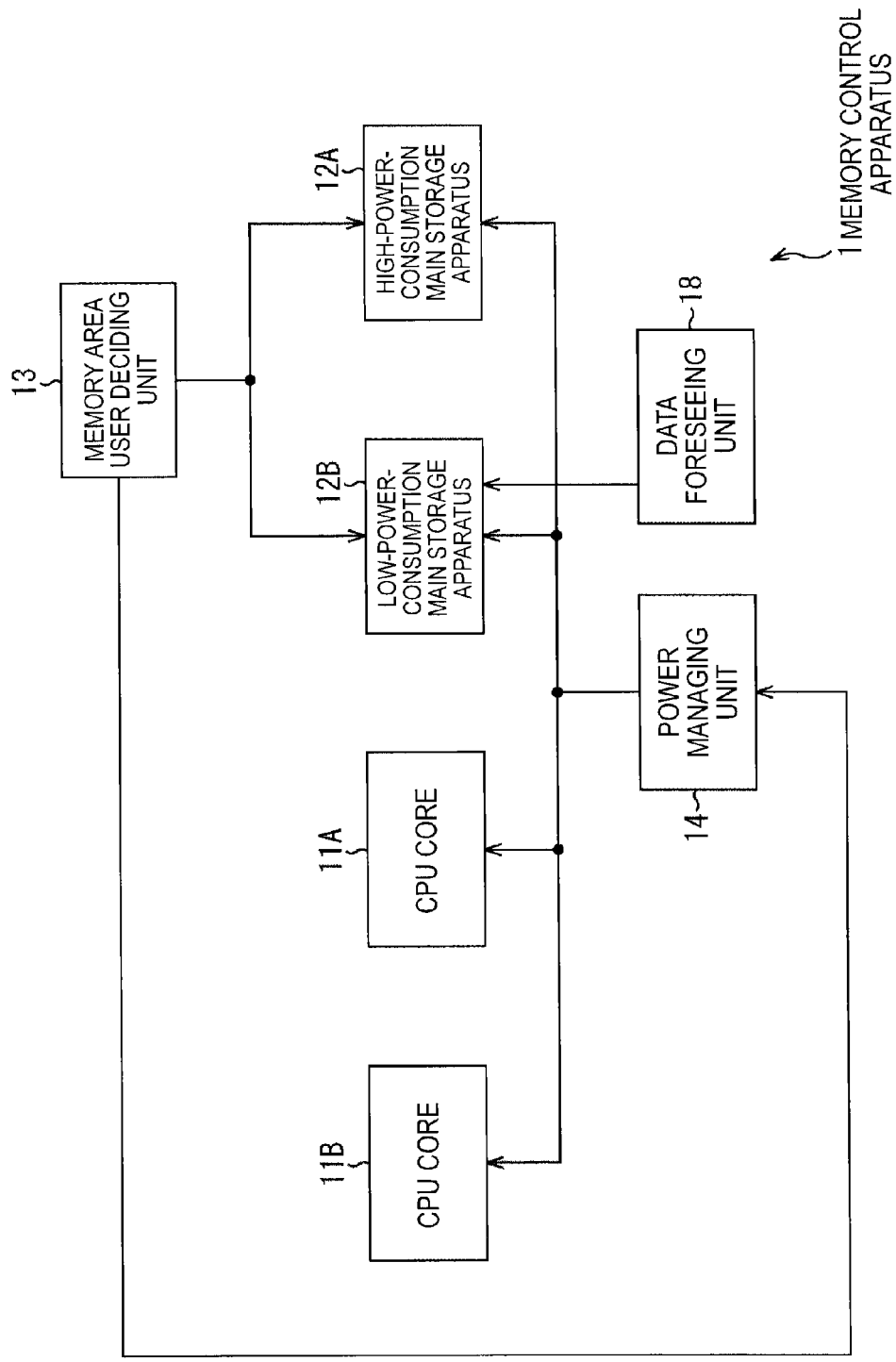
FIG. 9 is a block diagram illustrating a variation example of the memory control apparatus in FIG. 1.

FIG. 9 is a block diagram illustrating a variation example of the memory control apparatus 1 in FIG. 1.

In FIG. 9, a data foreseeing unit 18 is newly added to the memory control apparatus 1 in FIG. 1.

At the time of a shift to the power saving mode, the data foreseeing unit 18 predicts (or foresees) immediately-requested data among data moved to an external storage apparatus, and performs writing processing in the low-power-consumption main storage apparatus 12B. By this means, when the data moved to the external storage apparatus is requested, it is possible to reduce an occurrence of the time to wait for data to be read and speed up processing. For foreseeing of data, it is possible to use an existing foreseeing technique.

Also, in a case where there is an available area in the low-power-consumption main storage apparatus 12B, at the time of a shift to the power saving mode, the data foreseeing unit 18 may move all data stored in the high-power-consumption main storage apparatus 12 to the low-power-consumption main storage apparatus 12B.

As described above, in an information processing apparatus including the plurality of CPU cores 11 and at least two main storage apparatuses 12 of the high-power-consumption main storage apparatus 12 and the low-power-consumption main storage apparatus 12, the memory control apparatus 1 can set the power saving mode in addition to the normal power mode. In the power saving mode, in tandem with a non-operational mode that makes at least one CPU core 11 non-operational, it is possible to suppress (or stop) the power supply of the high-power-consumption main storage apparatus 12 and therefore it is possible to reduce the power consumption of the whole information processing apparatus.

Also, according to the above embodiments, an example has been explained where, in the power saving mode, the power of the high-power-consumption main storage apparatus 12A (DRAM 12A) is turned off. However, in a case where, in addition to power-off, the high-power-consumption main storage apparatus 12A (i.e. DRAM 12A) has a mode such as a suspend mode to suppress consumption power compared to the normal mode, such a mode (e.g. power suppression mode) may be selected. That is, the power saving mode of the memory control apparatus 1 also includes a mode such as the suspend mode to suppress the power consumption compared to the normal mode, in addition to a stop of the power supply (i.e. power-off).

Also, in the above embodiments, a case has been described where blocks to control the CPU core 11 and the main storage apparatus 12 are divided into the memory area user deciding unit 13, the power managing unit 14, the process managing unit 15 and the memory managing unit 16. However, these four blocks may be executed as one to three integrated processing blocks, modules or programs.

The above mentioned series of processes can be executed by hardware, or can be executed by software. In the case where the series of processes is executed by software, a program configuring this software is installed in a computer. Here, for example, a general purpose personal computer that can execute various functions is included in the computer, by installing a computer incorporated into specialized hardware and various programs.

[Configuration Example of Computer]

Figure 10:
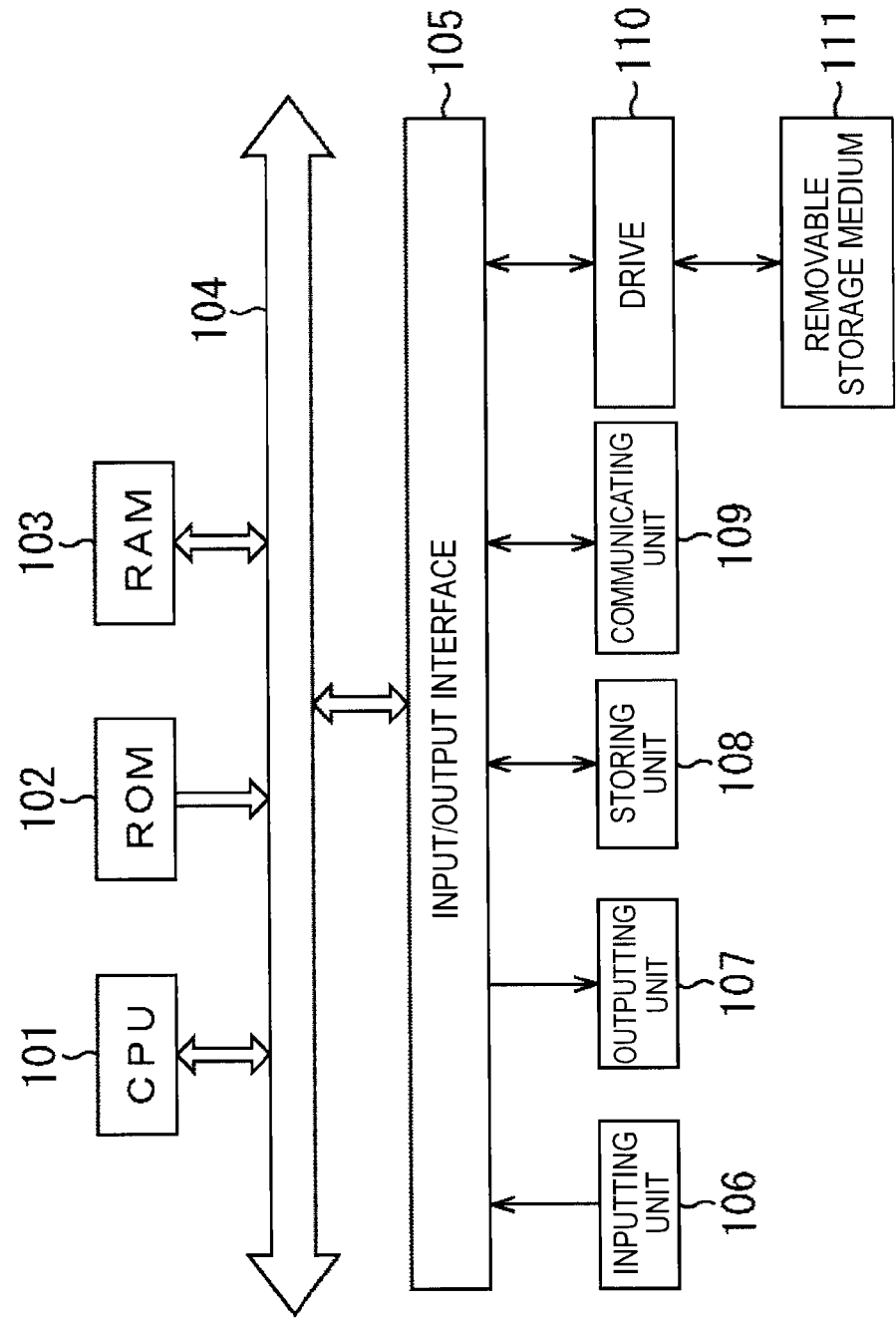
FIG. 10 is a block diagram illustrating a configuration example of a computer according to an embodiment to which the present disclosure is applied.

FIG. 10 is a block diagram showing a configuration example of hardware of a computer executing the above series of processes by a program.

A CPU (Central Processing Unit) 101, a ROM (Read Only Memory) 102, a RAM (Random Access memory) 103, and a bus 104 are mutually connected in the computer.

An input/output interface 105 is further connected to the bus 104. An inputting unit 106, an outputting unit 107, a storing unit 108, a communicating unit 109, and a drive 110 are connected to the input/output interface 105.

The inputting unit 106 includes a keyboard, a mouse, a microphone or the like. The outputting unit 107 includes a display, a speaker or the like. The storing unit 108 includes a hard disk, a nonvolatile memory or the like. The communicating unit 109 includes a network interface or the like. The drive 110 drives a removable storage media 111, such as a magnetic disk, an optical disk, a magneto-optical disk, or a semiconductor memory.

In a computer configured such as above, the above mentioned series of processes are executed, for example, by the CPU 101 loading and executing a program, which is stored in the storing unit 108, in the RAM 103 through the input/output interface 105 and the bus 104.

For example, the process managing unit 15 can be formed as one module to perform OS schedule management, the memory managing unit 16 can be formed as one module to perform OS memory management, and the memory area user deciding unit 13 can be formed as one module of the OS to perform the above memory area user decision.

In the computer, the program can be installed in the storing unit 108 through the input/output interface 105, by installing the removable storage media 111 in the drive 110. Further, the program can be received by the communicating unit 109 through the wired or wireless transmission medium, and can be installed in the storing unit 108. Additionally, the program can be installed beforehand in the ROM 102 and the storing unit 108.

In the above embodiments, a case has been described where blocks to control the CPU core 11 and the main storage apparatus 12 are divided into the memory area user deciding unit 13, the power managing unit 14, the process managing unit 15 and the memory managing unit 16. However, two to four of these may be integrated and executed as one processing block, module or program.

Also, in the present specification, the steps described in a flowchart may be naturally executed in time series along the described order, or, when they are not processed in the time series, they may be executed in parallel or at a requested timing such as call timing.

Embodiments of the present disclosure are not limited to the above embodiments and various changes may be made without departing from the scope of the gist of the present disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A memory control apparatus including:
  a deciding unit deciding, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended; and
  a power managing unit suppressing a power supplied to the second main storage apparatus and at least one of the multiple CPU cores in a case where the deciding unit decides that the second main storage apparatus is capable of being suspended.

(2) The memory control apparatus according to (1),
  wherein the multiple CPU cores include a CPU core with high power consumption and a CPU core with low power consumption, and
  wherein the power managing unit stops the power supplied to the CPU core with high power consumption and the second main storage apparatus in a case where the deciding unit decides that the second main storage apparatus is capable of being suspended.

(3) The memory control apparatus according to (1) or (2),
  wherein the multiple CPU cores include a CPU core with high power consumption and a CPU core with low power consumption, and
  wherein the power managing unit stops the power supplied to the CPU core with low power consumption in a case where the deciding unit decides that the second main storage apparatus is not capable of being suspended.

(4) The memory control apparatus according to (1),
  wherein the multiple CPU cores are CPU cores of same performance, and
  wherein the power managing unit stops a power supplied to the second main storage apparatus and the CPU core with a small usage amount of the first main storage apparatus in a case where the deciding unit decides that the second main storage apparatus is capable of being suspended.

(5) The memory control apparatus according to any one of (1) to (4), further including
  a foreseeing unit writing, in a case where the power supplied to the second main storage apparatus is stopped and data written in the second main storage apparatus is moved, the moved data in the first main storage apparatus.

(6) A memory control method performed by a memory control apparatus controlling a first main storage apparatus that is a main storage apparatus with low power consumption and a second main storage apparatus with power consumption higher than the power consumption of the first main storage apparatus as memory devices of multiple CPU cores, the method including:
  deciding whether the second main storage apparatus is capable of being suspended; and
  suppressing a power supplied to the second main storage apparatus and at least one of the multiple CPU cores in a case where it is decided that the second main storage apparatus is capable of being suspended.

(7) A program that causes a computer to perform processing of:
  deciding, among a first main storage apparatus that is a main storage apparatus with low power consumption and a second main storage apparatus with power consumption higher than the power consumption of the first main storage apparatus as memory devices of multiple CPU cores, whether the second main storage apparatus is capable of being suspended; and
  suppressing a power supplied to the second main storage apparatus and at least one of the multiple CPU cores in a case where it is decided that the second main storage apparatus is capable of being suspended.

(8) An information processing apparatus including:
  multiple CPU cores;
  a first main storage apparatus and a second main storage apparatus with power consumption higher than the power consumption of the first main storage apparatus; and
  a memory controlling unit controlling the first and second main storage apparatuses,
  wherein the memory controlling unit includes
    a deciding unit deciding whether the second main storage apparatus is capable of being suspended, and
    a power managing unit suppressing a power supplied to the second main storage apparatus and at least one of the multiple CPU cores in a case where the deciding unit decides that the second main storage apparatus is capable of being suspended.

(9) The information processing apparatus according to (8),
  wherein the multiple CPU cores include a CPU core with high power consumption and a CPU core with low power consumption, and
  wherein the power managing unit stops the power supplied to the CPU core with high power consumption and the second main storage apparatus in a case where the deciding unit decides that the second main storage apparatus is capable of being suspended.

(10) The information processing apparatus according to (8) or (9),
  wherein the multiple CPU cores include a CPU core with high power consumption and a CPU core with low power consumption, and
  wherein the power managing unit stops the power supplied to the CPU core with low power consumption in a case where the deciding unit decides that the second main storage apparatus is not capable of being suspended.

(11) The information processing apparatus according to (10),
wherein the multiple CPU cores are CPU cores of same performance, and
wherein the power managing unit stops a power supplied to the second main storage apparatus and the CPU core with a small usage amount of the first main storage apparatus in a case where the deciding unit decides that the second main storage apparatus is capable of being suspended.

(12) The information processing apparatus according to any one of (8) to (11), further including
a foreseeing unit writing, in a case where the power supplied to the second main storage apparatus is stopped and data written in the second main storage apparatus is moved, the moved data in the first main storage apparatus.

The present disclosure contains subject matter related to that disclosed in Japanese Priority Patent Application JP 2012-093711 filed in the Japan Patent Office on Apr. 17, 2012, the entire content of which is hereby incorporated by reference.

What is claimed is:

1. A memory control apparatus, comprising:
a deciding unit configured to decide, among a first main storage apparatus and a second main storage apparatus, that the second main storage apparatus is capable of being suspended, wherein the first main storage apparatus has a first power consumption and the second main storage apparatus has a second power consumption higher than the first power consumption of the first main storage apparatus, wherein the first main storage apparatus and the second main storage apparatus are memory devices of a plurality of Central Processing Unit (CPU) cores of same performance;
a power managing unit configured to suppress power supplied to the second main storage apparatus and a CPU core with smallest usage amount of the first main storage apparatus among the plurality of CPU cores of same performance, based on the deciding unit deciding that the second main storage apparatus is capable of being suspended; and
a foreseeing unit configured to write moved data in the first main storage apparatus based on the power supplied to the second main storage apparatus being stopped and data written in the second main storage apparatus being moved.

2. A memory control method, comprising:
deciding, among a first main storage apparatus and a second main storage apparatus, that the second main storage apparatus is capable of being suspended, wherein the first main storage apparatus has a first power consumption and the second main storage apparatus has a second power consumption higher than the first power consumption of the first main storage apparatus, wherein the first main storage apparatus and the second main storage apparatus are memory devices of a plurality of Central Processing Unit (CPU) cores of same performance;
suppressing power supplied to the second main storage apparatus and a CPU core with smallest usage amount of the first main storage apparatus among the plurality of CPU cores of same performance, based on deciding that the second main storage apparatus is capable of being suspended; and
writing moved data in the first main storage apparatus based on the power supplied to the second main storage apparatus being stopped and data written in the second main storage apparatus being moved.

3. A non-transitory computer-readable storage medium, having stored thereon computer-executable instructions, which when executed causes a computer to execute operations, the operations, comprising:
deciding, among a first main storage apparatus and a second main storage apparatus, that the second main storage apparatus is capable of being suspended, wherein the first main storage apparatus has a first power consumption and the second main storage apparatus has a second power consumption higher than the first power consumption of the first main storage apparatus, wherein the first main storage apparatus and the second main storage apparatus are memory devices of a plurality of Central Processing Unit (CPU) cores of same performance;
suppressing power supplied to the second main storage apparatus and a CPU core with smallest usage amount of the first main storage apparatus among the plurality of CPU cores of same performance, based on deciding that the second main storage apparatus is capable of being suspended; and
writing moved data in the first main storage apparatus based on the power supplied to the second main storage apparatus being stopped and data written in the second main storage apparatus being moved.

4. An information processing apparatus, comprising:
a plurality of Central Processing Unit (CPU) cores of same performance;
a first main storage apparatus with a first power consumption and a second main storage apparatus with a second power consumption higher than the first power consumption of the first main storage apparatus;
a memory controlling unit configured to control the first main storage apparatus and the second main storage apparatus,
wherein the memory controlling unit comprises:
a deciding unit configured to decide that the second main storage apparatus is capable of being suspended; and
a power managing unit configured to suppress power supplied to the second main storage apparatus and a CPU core with smallest usage amount of the first main storage apparatus among the plurality of CPU cores of same performance, based on the deciding unit deciding that the second main storage apparatus is capable of being suspended; and
a foreseeing unit configured to write moved data in the first main storage apparatus based on the power supplied to the second main storage apparatus being stopped and data written in the second main storage apparatus being moved.

* * * * *